United States Patent [19]

Peng et al.

[11] 4,037,359
[45] July 26, 1977

[54] BEAN SPROUT METHOD AND APPARATUS FOR GROWING SAME

[75] Inventors: Ting-fu Peng; Eng-Chin Peng, both of Baltimore, Md.

[73] Assignee: Terrell C. Birch, Falls Church, Va.

[21] Appl. No.: 605,997

[22] Filed: Aug. 20, 1975

Related U.S. Application Data

[63] Continuation-in-part of Ser. No. 478,578, June 12, 1974.

[51] Int. Cl.² .............................................. A01C 1/00
[52] U.S. Cl. .......................................... 47/14; 47/59
[58] Field of Search ........................ 47/1.2, 14–16, 47/59

[56] References Cited

U.S. PATENT DOCUMENTS

| | | | |
|---|---|---|---|
| 1,396,235 | 11/1921 | Renstrom | 47/16 |
| 2,810,988 | 10/1957 | Chin | 47/16 X |
| 2,814,912 | 12/1957 | Chew | 47/16 X |
| 3,141,263 | 7/1964 | Wang | 47/14 |
| 3,643,376 | 2/1972 | Poindexter et al. | 47/1.2 |
| 3,768,201 | 10/1973 | Yoo | 47/16 |
| 3,906,663 | 9/1975 | Peng et al. | 47/14 |

*Primary Examiner*—Ralph T. Rader
*Assistant Examiner*—James R. Feyrer
*Attorney, Agent, or Firm*—Terrell C. Birch

[57] ABSTRACT

A self watering bean sprout growing method and kit are provided. The kit includes a water impervious growth chamber in the configuration of a large open cooking vessel. A support surface is placed in the growth chamber and covered with a premoistened absorbent membrane over which bean seeds are spread in a layer. Provision is made for stacking alternate layers of membranes and bean or other seeds one on the other above the support surface to selectively vary the quantity of each batch of bean or other edible sprouts to be propagated. The growth chamber is capped with a water pervious primary reservoir whereby moisture is admitted to the growth chamber through the bottom of the reservoir. Venting of air to the growth chamber is provided between the auxiliary reservoir and the top of the growth chamber. The support surface comprises the bottom of an inverted vessel placed in the bottom of the growth chamber.

2 Claims, 7 Drawing Figures

BEAN SPROUT METHOD AND APPARATUS FOR GROWING SAME

This application is a continuation-in-part of copending application Ser. No. 478,578, filed June 12, 1974 for Method And Apparatus For Growing Bean Sprouts And Other Edible Sprouts.

This invention relates to means for germinating seeds and propagating sprouts therefrom and more particularly to a self-watering seed germinating and sprout propagating device for the production of edible sprouts in substantial quantities.

BACKGROUND OF THE INVENTION

Bean sprouts and other edible sprouts have long been recognized as a gourmet food not readily available to those enjoying home-grown vegetables.

In order to properly raise bean sprouts and other edible sprouts for the table, a relatively rigorous schedule of watering and attendant vigilance and inconvenience have heretofore been required in order to insure proper germination of the seeds and the ultimate propagation of healthy sprouts therefrom.

OBJECTS OF THE INVENTION

It is a primary object of the present invention to provide new and novel means for the home production of bean sprouts and other edible sprouts which substantially obviates the need for constant care and watering.

It is another object of the present invention to provide a new and novel self-watering edible sprout growing kit.

Another object of the present invention is to provide a new and novel method of producing substantial quantities of edible bean sprouts.

These and other objects of the present invention will become more readily apparent with reference to the following specification and drawings which relate to preferred embodiments of the present invention.

SUMMARY OF THE INVENTION

A growing chamber is provided in the form of a pot of impervious material such as a large cooking vessel or the like.

The growing chamber is open at the top and is adapted to receive a cover comprising a primary reservoir of water in the form of a pot of porous material such as fired clay.

Within the growing chamber a support surface in the configuration of an inverted fire clay or plastic pot or the like is placed at a position with the bottom thereof raised above the bottom of the growing chamber across substantially the entire lateral cross-section of the latter in the provision of a supporting surface.

An absorbent membrane is coextensively placed over the supporting surface to receive a layer of seeds to be sprouted.

In one embodiment an additional absorbent membrane is placed over the layer of seeds, more seeds are spread thereon and additional layers of said membranes and seeds are stacked one upon the other to provide for the desired ultimate quantity of edible sprouts to be produced in any given growing cycle of the invention.

The top cover and reservoir is then put in place over the growing chamber and, as will be more fully described hereinafter, the bean sprouts will be produced without further attention.

The absorbent membranes are premoistened and subsequently, water bled through the walls of the primary reservoir into the growing chamber is absorbed and assimilated by the seeds resulting in the production of edible sprouts.

The raised supporting surface provides a run-off surface which precludes an undue collection of water around the seeds and resultant sprouts, to optimize the quality of the sprouts produced.

DETAILED DESCRIPTION OF THE DRAWINGS

Figure 1:
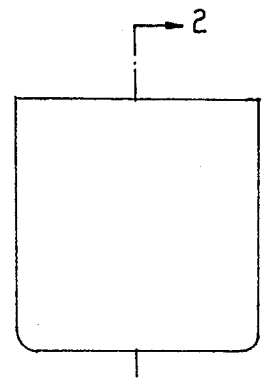
FIG. 1 is a side elevation of the growing chamber of a multi-layer sprout growing device.
Figure 2:
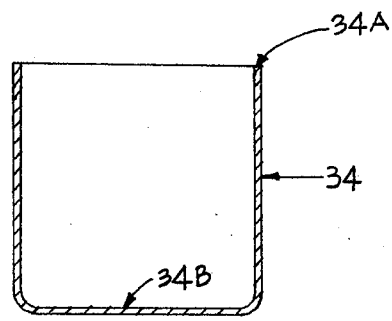
FIG. 2 is a cross-section taken along line 2—2 of FIG. 1.
Figure 3:
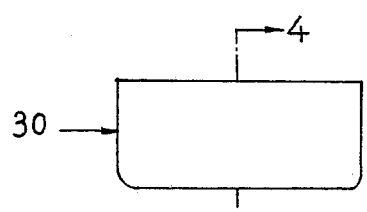
FIG. 3 is a side elevation of the primary water reservoir of the present invention.
Figure 4:
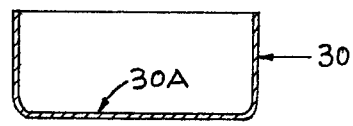
FIG. 4 is a cross-section taken along line 4—4 of FIG. 3.
Figure 5:
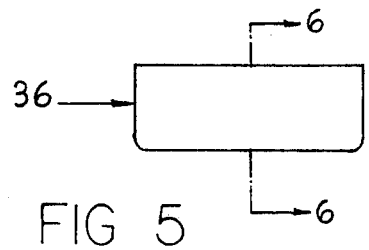
FIG. 5 is a side elevation of in the invertable container comprising the elevated support surface of the present invention.
Figure 6:
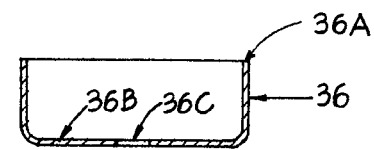
FIG. 6 is a cross-section taken along line 6—6 of FIG. 5.
Figure 7:
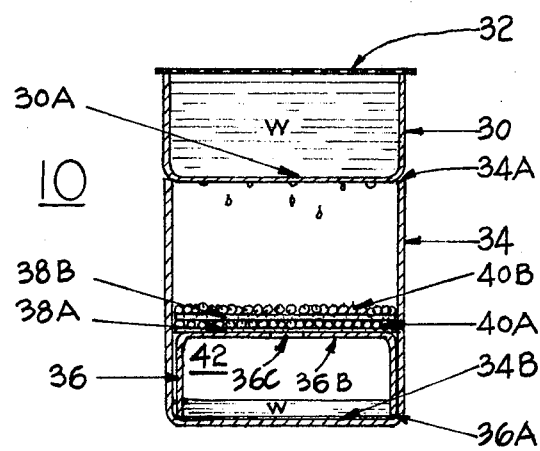
FIG. 7 is a cross-sectional view of an assembled sprout growing kit of the present invention.

Referring in detail to the drawings and with particular reference to FIGS. 1-7, the edible sprout growing kit 10 of the present invention is shown as including a primary reservoir 30 of a material pervious to water, such as fired clay, open at the top end thereof and receiving over said top end a perforated or vented lid 32.

Growing chamber 34 of water impervious material such as metal or plastic in the configuration of an open-topped cooking vessel or pot is coaxially disposed beneath the primary reservoir 30, supporting the latter upon the top rim 34A of the growing chamber in a loose fit permitting the passage of air therebetween.

The water pervious material of the primary reservoir 30 permits a predictable seepage of moisture therefrom into the growing chamber 34 through the bottom 30A of the said reservoir 30.

The preclusion of an air tight fit of the primary reservoir 30 and top rim 34A of the growing chamber 34 is a requisite for the growth of bean or other edible sprouts in the latter, permitting exposure of the seeds and sprouts to air.

The perforated or vented lid 32 enhances the propensity of the water W in the said reservoir 30 to seep into the growth chamber 34.

In the very bottom of the growth chamber 34 is an inverted vessel 36 such as a fired clay or plastic pot, the upturned bottom surface 36B of the latter being substantially coextensive with the cross-section of the growing chamber 34 and the rim 36A of the vessel 36 rests on the bottom 34B of the growth chamber 34. Then, the bottom 36B provides a raised support surface above the bottom 34B of the growth chamber 34. A finger hole 36C is placed in the center of the surface 36B to permit easy insertion and removal of the inverted vessel 36 from the bottom of the growth chamber 34.

Over the support surface 36B is placed on absorbent membrane 38A substantially coextensive therewith, said membrane 38A for example, comprising paper toweling or the like.

The membrane 38A provides support for a first layer of bean or other seeds 40A.

Additional alternate layers of porous membranes 38B, and bean or other seeds 40B, respectively, are added to effect growth of desired quantities of bean or other edible sprouts therefrom within the growth chamber 34.

OPERATION OF THE INVENTION

While there are several varieties of seeds which are suitable for growing edible sprouts, the mung bean is a readily available and popular variety and will be used by way of example in describing the operation of the present invention.

Initially a predetermined quantity of mung beans, such as 2.5 ounces, is rinsed in fresh water and soaked overnight in warm water.

Then, with all of the components thoroughly cleaned and washed, the following steps are followed:

The vessel 36, inverted to properly dispose the supportsurface 36B is placed in the bottom of the growth chamber 34 with the rim 36A engaging the bottom 34B of the growth chamber 34.

The first absorbent membrane 38A is placed over the upper surface of the support surface 36B in a premoistened state;

A layer of the presoaked bean seeds 40A is spread over the absorbent membrane 38A;

The second absorbent membrane 38B is placed over the first layer of bean seeds 40A;

A second layer of bean seeds 40B is placed over the second membrane 38B;

Additional alternate layers of bean seeds 40 and membranes 38 are added as desired relative to the quantity of sprouts to be produced;

The primary reservoir 30 is filled with water, covered and placed on the rim 34A of the growth chamber 34;

Fill the main reservoir 30 with water W; and the kit 10, as assembled and filled, is put in a warm place of about 75° F.

Within four to five days the water W dripping into the growth chamber 34 from the primary reservoir 30 and absorbed in the membranes 38A, 38B will result in the production of bean sprouts in the amount of approximatly five times the initial weight of the mung bean seeds initially placed in the growth chamber 34.

The raised supporting surface 36B acts as a drain to preclude excess water from standing in the sprouting bean seeds 40A, 40B. The excess water W passes from the surface 36B and collects in the bottom of the growth chamber 34 providing a secondary reservoir 42 which assists in maintaining the moisture level in the growth chamber 34.

As can readily be seen from the foregoing specification and drawings, this invention provides a new and novel means for growing bean or other edible sprouts in the home in an efficient and facile manner, obviating the need for constant care and attention of the seeds during the entire germinating and sprout propagating process.

The present invention provides a growing kit for edible sprouts utilizing a minimum number of component parts while simultaneously providing a reliable and predictable source of moisture for the seeds and sprouts.

It is to be understood that the various sizes, shapes and materials of the various components of the present invention may be varied so long as the requisite properties of absorbency and porosity are maintained. For example, if desired the inverted vessel 36 can be made of either porous or non-porous material.

I wish it to be understood that I do not desire to be limited to the exact details of construction shown and described, for obvious modifications can be made by a person skilled in the art.

We claim:

1. Self watering kit means for growing edible sprouts from seeds comprising:
    a growth chamber comprising a container constructed of water impervious material and open only at its top end, said container being devoid of any drain means below its top end;
    an open top, inverted vessel of material porous to the passage of liquid only by capillary action mounted on the bottom of said growth chamber and having both a side wall and a bottom portion of said material, said bottom portion extending across substantially the entire transverse cross-section of said growth chamber and spaced from the bottom of the latter to thereby provide an elevated support surface;
    a primary water reservoir comprising an open top container of material porous to the passage of liquid only by capillary action and acting in conjunction with the force of gravity and the head of water contained therein to supply water to said growth chamber, said primary water reservoir substantially closing and engaged with the top of said growth chamber, but permitting the flow of air therebetween into and out of said growth chamber;
    a perforate lid covering the top of said primary reservoir; and
    at least one absorbent membrane overlying and coextensively juxtaposed with said elevated support surface for receiving a layer of seeds for sprouting;
    said growth chamber preventing any loss of water from said means for growing edible sprouts at any point except by the flow of air into and out of said growth chamber; and
    said sidewall of said inverted vessel conducting water by capillary action from the bottom of said growth chamber up to the bottom portion of said inverted vessel.

2. Self watering kit means for growing edible sprouts from seeds comprising:
    a growth chamber comprising a container constructed of water impervious material and open only at its top end, said container being devoid of any drain means below its top end;
    an open top, inverted vessel of material porous to the passage of liquid only by capillary action mounted on the bottom of said growth chamber and having both a side wall and a bottom portion of said material, said bottom portion extending across substantially the entire transverse cross-section of said growth chamber and spaced from the bottom of the latter of thereby provide an elevated support surface;
    a primary water reservoir comprising an open top container of material porous to the passage of liquid only by capillary action, said primary water reservoir substantially closing and engaged with the top of said growth chamber, but permitting the flow of fluid therebetween into and out of said growth chamber;
    a perforate lid covering the top of said primary reservoir; and at least one absorbent membrane overlying and coextensively juxtaposed with said elevated support surface for receiving a layer of seeds for sprouting;

said growth chamber preventing any loss of water from said means for growing edible sprouts at any point below the level of the top of said growth chamber; and said sidewall of said inverted vessel conducting water by capillary action from the bottom of said growth chamber up to the bottom portion of said inverted vessel.

* * * * *